(12) United States Patent
Osaki

(10) Patent No.: US 8,767,122 B2
(45) Date of Patent: Jul. 1, 2014

(54) REPRODUCTION CONTROLLING METHOD AND RECEIVING APPARATUS

(75) Inventor: Koichi Osaki, Kanagawa (JP)

(73) Assignee: Sony Corporation (JP)

(*) Notice: Subject to any disclaimer, the term of this patent is extended or adjusted under 35 U.S.C. 154(b) by 943 days.

(21) Appl. No.: 12/080,993

(22) Filed: Apr. 8, 2008

(65) Prior Publication Data

US 2008/0256589 A1    Oct. 16, 2008

(30) Foreign Application Priority Data

Apr. 12, 2007    (JP) ................ P2007-104594

(51) Int. Cl.
*H04N 9/475*    (2006.01)

(52) U.S. Cl.
USPC .......................... 348/512; 348/515

(58) Field of Classification Search
USPC ................................. 348/512, 515
See application file for complete search history.

(56) References Cited

U.S. PATENT DOCUMENTS

| | | | | |
|---|---|---|---|---|
| 6,018,376 | A * | 1/2000 | Nakatani ................. | 375/240.28 |
| 2004/0052371 | A1* | 3/2004 | Watanabe .................... | 380/233 |
| 2006/0271983 | A1* | 11/2006 | Katayama et al. ........... | 725/100 |
| 2009/0144769 | A1* | 6/2009 | Liebhold et al. ............... | 725/39 |

FOREIGN PATENT DOCUMENTS

| | | |
|---|---|---|
| JP | 2000050264 A | 2/2000 |
| JP | 2003-209791 A | 7/2003 |
| JP | 2004072618 A | 3/2004 |
| JP | 2006-148969 A | 6/2006 |
| JP | 2006168969 A | 6/2006 |
| JP | 2006310977 A | 11/2006 |
| JP | 2007013826 A | 1/2007 |
| JP | 2007287199 A | 11/2007 |

OTHER PUBLICATIONS

Office Action from Japanese Application No. 2007-104594, dated Oct. 12, 2010.

* cited by examiner

*Primary Examiner* — Nasser Goodarzi
*Assistant Examiner* — Fred Peng
(74) *Attorney, Agent, or Firm* — Lerner, David, Littenberg, Krumholz & Mentlik, LLP

(57) ABSTRACT

A method of controlling reproduction for a stream containing video data and/or audio data is disclosed. A mute process is performed for a decoded output of the stream. A first decode process is performed to decode a partial region of the stream from a beginning thereof and obtain attribute information from the stream. Parameters with which the stream is reproduced are set on a basis of the attribute information. The mute process is stopped after the parameters have been set. A second decode process is performed to decode the stream from the beginning thereof.

7 Claims, 4 Drawing Sheets

REPRODUCTION CONTROLLING METHOD AND RECEIVING APPARATUS

CROSS-REFERENCE TO RELATED APPLICATIONS

The present application claims priority from Japanese Patent Application No. JP 2007-104594, filed in the Japanese Patent Office on Apr. 12, 2007, the entire content of which is incorporated herein by reference.

BACKGROUND OF THE INVENTION

1. Field of the Invention

The present invention relates to a reproduction controlling method of reproducing stored stream data and a receiving apparatus that uses the reproduction controlling method.

2. Description of the Related Art

In recent years, a technology called DLNA (Digital Living Network Alliance) that connects various types of home-use electronic devices through LAN (Local Area Network), forms their network, and allows content such as pictures and music to be shared has been proposed. As a product according to DLNA, a receiving apparatus that can reproduce stream data such as a video stream and an audio stream stored in a device such as an external home server or in the receiving apparatus itself has been proposed.

In stream data such as a video stream and an audio stream, parameters such as resolution and aspect ratio have been set according to these data. When these stream data are reproduced by the receiving apparatus, it changes their settings according to the parameters of the stream data and properly reproduces the stream data.

Specifically, when a receiving apparatus of the related art reproduces stream data such as a video stream and an audio streams, the receiving apparatus obtains attribute information of the stream data such as resolution and aspect ratio of pictures and sampling rate of sounds from the stream data, sets various types of parameters based on the obtained attribute information, performs a decode process for the stream data, and reproduces pictures and sounds.

However, while the receiving apparatus is setting the parameters, decoded pictures are likely disturbed or decoded sounds likely become abnormal. Thus, in the related art, a mute process of causing a black picture to displayed on the entire display area and sounds not to be generated is performed. After the parameters have been set, the mute process is stopped.

While parameters are being set, when the mute process is performed, the user can be prevented from becoming uncomfortable with disturbed pictures and abnormal sounds. A technique of performing such a mute process is described in Japanese Patent Application Laid-Open No. 2006-148969 (hereinafter referred to as Patent Document 1).

SUMMARY OF THE INVENTION

As described above, in the related art, a parameter setting process for parameters such as resolution and aspect ratio and a decode process for stream data are performed in parallel. Thus, while parameters are being set, pictures and sounds obtained in the decode process are reproduced. However, since the mute process is performed until the parameters have been set, the decoded pictures and sounds that have been obtained in the decode process are not output.

Next, an reproducing operation of the receiving apparatus for a video stream will be described in detail. As shown in FIG. 1, when the reproduction process is started, the mute process is performed to prevent disturbed pictures from being displayed. When the mute process is performed, for example, a black picture is displayed on the entire display area of the display section. When the decoder of the receiving apparatus starts the decode process for a video stream, although a video signal obtained in the decode process is output at time X, since the mute process is being performed, pictures are not displayed on the display section.

At time Y, parameters are set on the basis of attribute information that has been obtained in the decode process of the decoder. In the region from time Y to time Z, the parameter setting process is performed. After the parameters have been set at time Z, the mute process is stopped, pictures obtained in the decode process are output, and the pictures are displayed on the display section.

Since the mute process is performed in the region after the reproduction process is started until the parameters have been set at time Z, pictures that have bee decoded in the region from time X to time Z are not displayed. In other words, pictures that have been decoded while the mute process is being performed are not output to the outside. Thus, since pictures at the beginning of the stream data are not reproduced, a problem of "loss of beginning" occurs.

In view of the foregoing, it would be desirable to provide a reproduction controlling method that allows data to be securely reproduced from the beginning of stored stream data without "loss of beginning" and a receiving apparatus using the reproduction controlling method.

According to an embodiment of the present invention, there is provided a method of controlling reproduction for a stream containing video data and/or audio data. A mute process is performed for a decoded output of the stream. A first decode process is performed to decode a partial region of the stream from a beginning thereof and obtain attribute information from the stream. Parameters with which the stream is reproduced are set on a basis of the attribute information. The mute process is stopped after the parameters have been set. A second decode process is performed to decode the stream from the beginning thereof.

According to an embodiment of the present invention, there is provided a receiving apparatus which receives a digital television broadcast. The receiving apparatus includes a decoder, a video process section, an audio process section, and a control section. The decoder decodes a stream containing video data and/or audio data, obtains attribute information from the stream, and outputs a video signal and an audio signal. The video process section performs a predetermined video process for the video signal. The audio process section performs a predetermined audio process for the audio signal. The control section controls processes for the decoder, the video process section, and the audio process section. The control section controls the video process section and the audio process section to perform a mute process for a decoded output of the stream, the decoder to perform a first decode process of decoding a partial region of the stream from a beginning thereof and obtaining attribute information from the stream, the video process section and the audio process section to set parameters with which the stream is reproduced on a basis of the attribute information, the video process section and audio process section to stop the mute process after they have set the parameters, and the decoder to perform a second decode process of decoding the stream from the beginning thereof.

According to the foregoing embodiments, a mute process is performed for a decoded output of the stream. A first decode process is performed to decode a partial region of the stream from a beginning thereof and obtain attribute information from the stream. Parameters with which the stream is reproduced are set on a basis of the attribute information. The mute process is stopped after the parameters have been set. A second decode process is performed to decode the stream from the beginning thereof. Thus, the video stream and audio stream can be securely reproduced from the beginning thereof.

According to the foregoing embodiments, in the first decode process, attribute information of a video stream and an audio stream are obtained and parameters are set on the basis of the obtained attribute information. Thereafter, in the second decode process, pictures and sounds are output. Thus, as an effect of the embodiments, the video stream and the audio stream can be properly reproduced from the beginning thereof.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Next, an embodiment of the present invention will be described. In this embodiment, when stream data stored in a receiving apparatus or in an external device are reproduced, information that represents attributes of the stream data is obtained in a decode process and then the decode process is performed again for the same stream data such that the stream data are securely reproduced from the beginning. Next, the case of which data that have been compression-encoded according to the MPEG-2 (Moving Picture Experts Group-2) systems are used as stream data will be exemplified.

Figure 1:
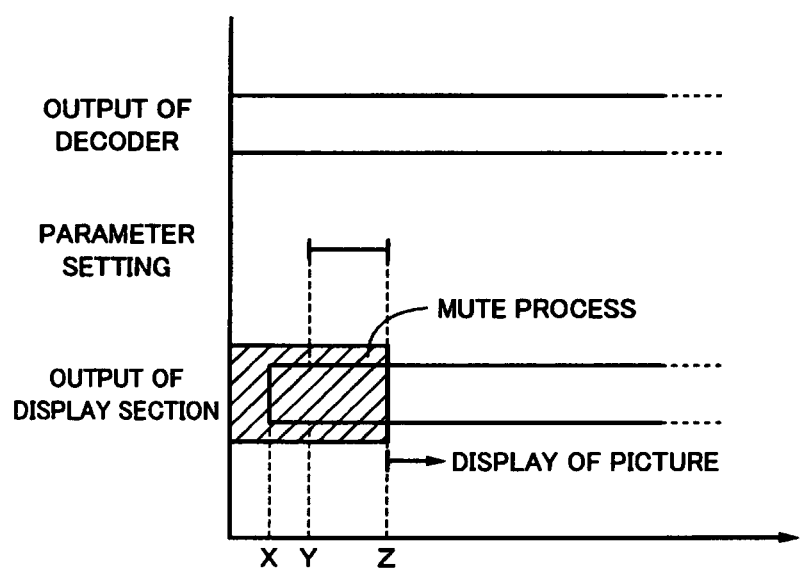
FIG. 1 is a schematic diagram describing a reproduction controlling method of the related art.
Figure 2:
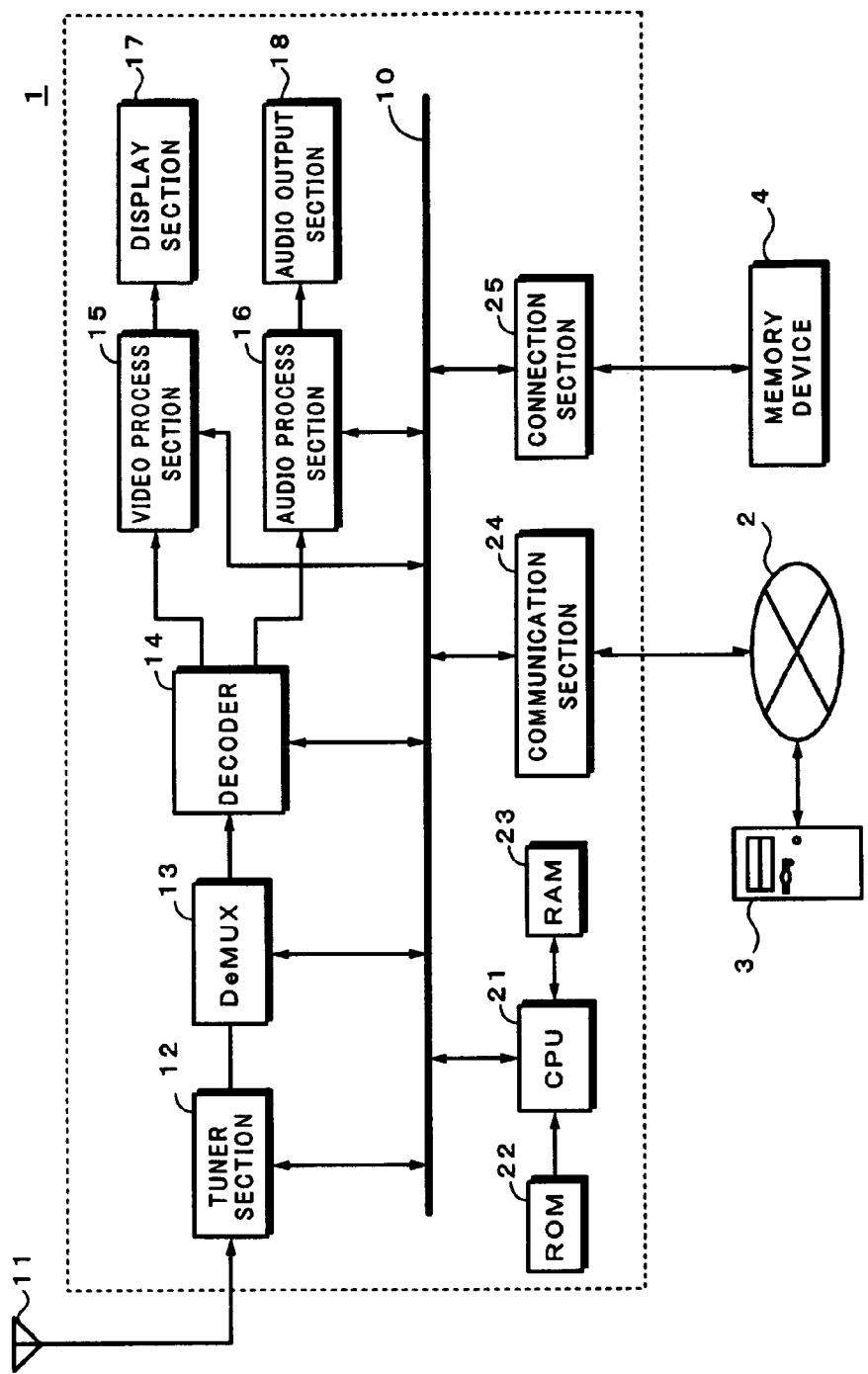
FIG. 2 is a block diagram showing an example of the structure of a receiving apparatus according to an embodiment of the present invention.

As shown in FIG. 2, the receiving apparatus 1 is a television receiver that can receive a digital television broadcast. The receiving apparatus 1 includes an antenna 11, a tuner section 12, a demultiplexer 13, a decoder 14, a video process section 15, an audio process section 16, a display section 17, an audio output section 18, a CPU (Central Processing Unit) 21 as a control section, a ROM (Read Only Memory) 22, a RAM (Random Access Memory) 23, a communication section 24, and a connection section 25 that are connected through a bus 10.

The receiving apparatus 1 receives a radio wave of a digital television broadcast transmitted from a broadcasting facility (not shown) through an antenna 11 that is connected to the outside of the receiving apparatus 1. The receiving apparatus 1 supplies the received radio wave of the digital television broadcast to the tuner section 12. The tuner section 12 selects a modulated signal of predetermined frequency from the radio wave of the digital television broadcast supplied through the antenna 11. The tuner section 12 performs predetermined signal processes including a demodulation process and an error correction process for the selected modulated signal, packetizes video data and audio data for each channel and for each data type according to the prescription of the MPEG-2 systems, outputs a time-division multiplexed transport stream (TS), and supplies the TS to the demultiplexer 13.

The demultiplexer 13 filters the supplied TS based on the value of PID (Packet IDentification) that is contained in the header portion of each TS packet and that identifies each packet, extracts necessary stream data such as a video stream and an audio stream from the multiplexed TS, and supplies the extracted stream data to the decoder 14.

The decoder 14 performs a decode process for each of the video stream and the audio stream under the control of the CPU 21 (that will be described later) and outputs a video signal and an audio signal. The decoded video signal and audio signal are supplied to the video process section 15 and the audio process section 16, respectively.

In addition, the decoder 14 obtains attribute information of the video stream and audio stream and supplies the attribute information to the CPU 21. The attribute information of the video stream is described in the header thereof. The attribute information describes various types of parameters that are set by the video process section 15 (that will be described later).

A video stream that has been compression-encoded according to the MPEG-2 systems is hierarchically composed of six layers of sequence, GOP (Group of Pictures), picture, slice, macro block, and block. A sequence header is added at the beginning of the sequence layer. The sequence header designates the screen format and so forth. Attribute information described in the sequence header includes, for example, horizontal size and vertical size of screen that represent resolution, aspect ratio, and frequency of interlaced/progressive pictures.

Like the video stream, attribute information of the audio stream is described in an audio frame header added at the beginning of the audio stream. The attribute information of the audio stream describes various types of parameters that are set by the audio process section 16 (that will be described later). Attribute information described in the audio frame header includes, for example, sampling rate, compression format such as LPCM (Linear Pulse Code Modulation) or AAC (Advanced Audio Coding), and number of channels.

The video process section 15 performs predetermined video processes that include noise reduction, resolution conversion, and frame interpolation for the supplied video signal and supplies the processed video signal to the display section 17. The display section 17 displays the supplied video signal. The display section 17 is, for example, a CRT (Cathode Ray Tube) or an LCD (Liquid Crystal Display). In this example, the video processes includes, for example, parameter setting based on attribute information of a video stream that is decoded, a process based on parameters that have been set, and a process corresponding to the resolution of the display section 17 such as an LCD.

In addition, to prevent pictures that are displayed when parameters are set from being disturbed, the video process section 15 performs a mute process of displaying a black picture on the entire display area of the display section 17 under the control of the CPU 21.

The audio process section 16 performs predetermined audio processes for the supplied audio signal and supplies the processed audio signal to the audio output section 18. The audio output section 18 outputs sounds based on the supplied audio signal. In this example, the audio processes include parameter setting based on attribute information of an audio stream that is decoded.

In addition, to prevent sounds from being abnormally generated when parameters are set, the audio process section 16 performs a mute process of causing the audio output section 18 not to generate sounds under the control of the CPU 21.

The CPU 21 controls each section of the apparatus connected to the bus 10 according to a program pre-stored in the ROM 22 with the RAM 23 as a work memory. The CPU 21 controls the video process section 15 and the audio process section 16 to perform the mute process and sets parameters based on attribute information of a video stream and an audio stream received from the decoder 14. In addition, the CPU 21 requests the decoder 14 to start and stop the decode process and supplies a video stream and an audio stream received through the communication section 24 or the connection section 25 and those received from a storage section of a memory device 4 (that will be described later) to the decoder 14.

The communication section 24 controls communications with an electronic device 3 such as a server connected through a network 2 such as Ethernet (registered trademark) or the Internet according to a predetermined communication protocol such as TCP/IP (Transmission Control Protocol/Internet Protocol). The communication section 24 controls communications according to commands issued from the CPU 21. The communication section 24 receives a video stream and an audio stream from the storage section of the external electronic device 3 through the network 2 and supplies the received video stream and audio stream to the CPU 21.

The connection section 25 is mutually connected to an external memory device 4 according to a predetermined connecting system. The connection section 25 communicates with the external memory device 4 according to a predetermined protocol. The connection system is, for example, USB (Universal Serial Bus) and IEEE (Instituted of Electrical and Electronics Engineers) 1394. The connection section 25 receives a video stream and an audio stream from the memory device 4 and supplies them to the CPU 21 under the control thereof.

The memory device 4 has a connection section and a storage section (not shown). When the connection section of the memory device 4 is connected to the connection section 25 of the receiving apparatus 1, the memory device 4 is recognized as a storage device of the receiving apparatus 1. The CPU 21 controls the storage section to transmit and receive a video stream and an audio stream stored therein. The storage section of the memory device 4 is, for example, HDD (Hard Disk Drive), a non-volatile memory, or a disc-shaped record medium such as CD (Compact Disc) or DVD (Digital Versatile Disc).

Like the foregoing stream data for a digital television broadcast, stream data such as a video stream and an audio stream stored in the external electronic device 3 and the storage section of the memory device 4 have been compression-encoded according to, for example, the MPEG2-2 systems.

In this example, a video stream and an audio stream are received from the storage section of the external device through the communication section 24 or the connection section 25. Instead, the storage section may be disposed, for example, in the receiving apparatus 1 and those stored in the storage section may be used. The storage section may be, for example, HDD, a non-volatile memory, or a disc-shaped record medium such as CD or DVD.

Figure 3:
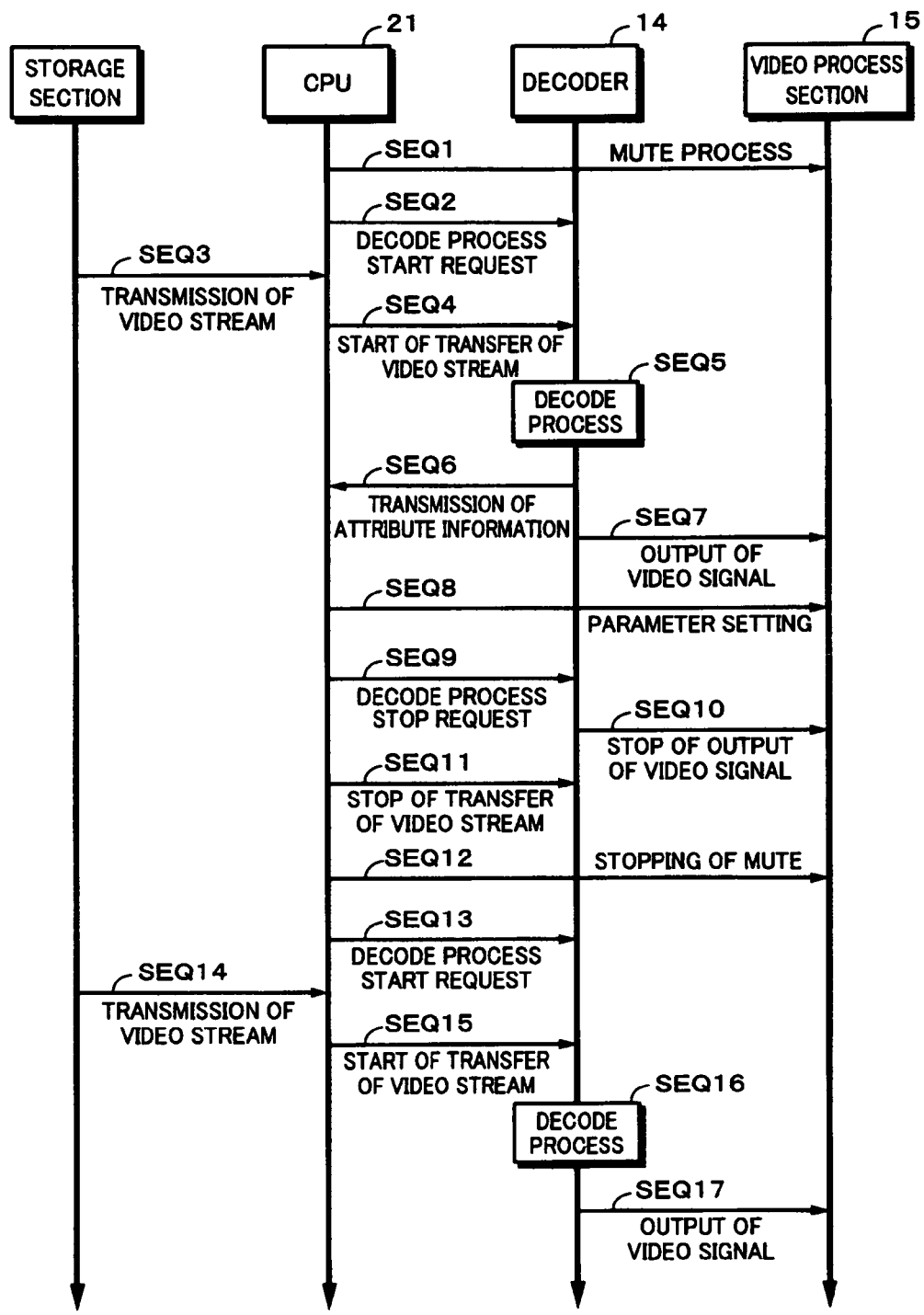
FIG. 3 is a sequence diagram describing a flow of a reproduction process according to an embodiment of the present invention.

Next, with reference to a sequence chart shown in FIG. 3, a flow of a reproduction process according to an embodiment of the present invention will be described. In the following, the case of which a video stream and an audio stream stored in the storage section of the external device will be described. In the following, the reproduction process of the video process section 15 for a video stream will be described. However, this reproduction process can apply to that of the audio process section 16 for an audio stream.

At sequence SEQ1, the video process section 15 performs the mute process under the control of the CPU 21 to cause the display section 17 to display, for example, a black picture on the entire display area. At sequence SEQ2, the CPU 21 requests the decoder 14 to start the decode process. At this point, since a video stream has not been supplied to the decoder 14, the decode process is not performed. At sequence SEQ3, the CPU 21 receives a video stream from the external device through the network 2. At sequence SEQ4, the CPU 21 transfers the video stream received from the external device to the decoder 14.

At sequence SEQ5, the decoder 14 receives the video stream from the CPU 21, performs the decode process for the video stream, and obtains both attribute information from the sequence header of the video stream and a video signal from the video stream. At sequence SEQ6, the decoder 14 supplies the obtained attribute information to the CPU 21. At sequence SEQ7, the decoder 14 supplies the video signal obtained in the decode process to the video process section 15 and causes the display section 17 to display the video signal. At this point, however, since the video process section 15 is performing the mute process, the display section 17 does not display a picture.

At sequence SEQ8, the CPU 21 causes the video process section 15 to set parameters based on the attribute information received from the decoder 14. After the video process section 15 has set the parameters, the CPU 21 requests the decoder 14 to stop the decode process at sequence SEQ9. At sequence SEQ10, the decoder 14 stops the decode process based on the stop request received from the CPU 21 and stops outputting the video signal to the video process section 15. At sequence SEQ11, the CPU 21 stops supplying the video stream to the decoder 14.

At sequence SEQ12, the video process section 15 stops the mute process under the control of the CPU 21. At sequence SEQ13, the CPU 21 requests the decoder 14 to start the decode process again. At sequence SEQ14, the CPU 21 receives the same video stream as that received at sequence SEQ3 from the external device through the network 2. At sequence SEQ15, the CPU 21 transfers the video stream received from the external device to the decoder 14.

At sequence SEQ16, the decoder 14 performs the decode process for the video stream received from the CPU 21 and obtains a video signal from the video stream. At sequence SEQ17, the decoder 14 supplies the obtained video signal to the video process section 15 and causes the display section 17 to display the video signal. At this point, since the mute process has not been performed, the display section 17 displays a picture as it is.

In the foregoing example, a method of reproducing a video stream stored in the storage section of the electronic device 3 connected through the network 2 was described. This method applies to the case that a video stream stored in the storage section of the memory device 4 connected to the connection section 25 is reproduced. In addition, this method applies to the case that the receiving apparatus 1 has the storage section.

Figure 4:
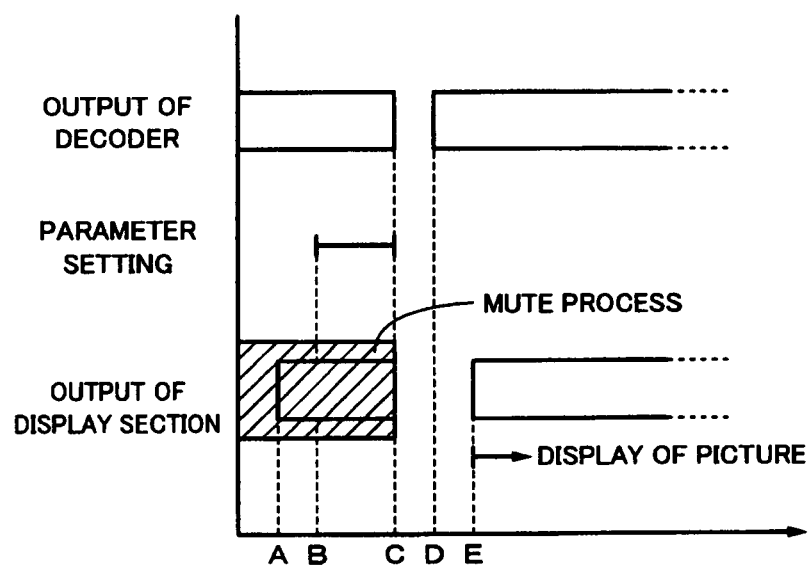
FIG. 4 is a schematic diagram describing a reproduction controlling method according to an embodiment of the present invention.

Next, an operation according to the foregoing reproduction controlling method will be described in detail. For example, as shown in FIG. 4, to prevent the display section 17 from displaying disturbed pictures, the video process section 15 performs the mute process under the control of the CPU 21. When the decoder 14 starts the first decode process for a transferred video stream according to a decode process start request received from the CPU 21, a video signal obtained in the decode process is output to the display section 17 at time A. However, since the mute process is being performed for the display section 17, it does not display a decoded picture. At time B, the video process section 15 starts setting parameters based on attribute information obtained in the decode process. The video process section 15 performs the parameter setting process in the region from time B to time C. After the parameters have been set, the decode process is stopped, the output of the video signal is stopped, and the mute process is stopped at time C.

After parameters have been set, the decoder 14 performs the decode process again at time D. At time E, the display section 17 displays a decoded picture. At this point, since parameters have been set on the basis of the attribute information obtained in the first decode process, pictures can be properly output from the beginning of the video stream that is decoded. Thus, the pictures can be displayed free of disturbance.

Thus, in this embodiment, the decode process is performed to obtain attribute information of a video stream and an audio stream as a first decode process. Parameters are set on the basis of the obtained attribute information. After the parameters have been set, the decode process is performed for the same video stream and audio stream again as a second decode process. The resultant pictures and sounds are output. Thus, when stream data are reproduced, pictures and sounds can be output from the beginning of the stream data.

It should be understood by those skilled in the art that various modifications, combinations, sub-combinations and alternations may occur depending on design requirements and other factors insofar as they are within the scope of the appended claims or the equivalents thereof. For example, the compression-encoding system for stream data may be other than the MPEG-2 systems.

What is claimed is:

1. A method of controlling reproduction for a stream containing video data and/or audio data within a predetermined network, comprising the steps of:
    performing a mute process for a decoded output of the stream;
    performing a first decode process of decoding a partial region of the stream from a beginning thereof and obtaining attribute information from the stream;
    setting parameters with which the stream is reproduced on a basis of the attribute information;
    stopping the first decode process and the mute process immediately after the parameters have been set; and
    performing a second decode process of decoding the stream from the beginning thereof,
    in which the mute process causes a black picture to be displayed on a display screen and/or sounds not to be generated, such that during the mute process pictures corresponding to the decoded output are not displayed on the display screen and/or sounds corresponding to the decoded output are not generated,
    in which the second decode process is performed after a first amount of time has elapsed after (i) the first decode process is stopped, (ii) the parameters are set, and (iii) the mute process is stopped, and the pictures corresponding to the decoded output are enabled to be displayed on the display screen and/or the sounds corresponding to the decoded output are enabled to be generated after a second amount of time has elapsed after (i) the first decode process is stopped, (ii) the parameters are set, and (iii) the mute process is stopped, in which the second amount of time is larger than the first amount of time, such that the decoding performed by the second decode process is not continuous with an end of the decoding performed by the first decode process.

2. The reproduction controlling method as set forth in claim 1, wherein the attribute information is described in a header of the stream.

3. The reproduction controlling method as set forth in claim 1, in which the parameters which are set include parameters pertaining to resolution and aspect ratio.

4. The reproduction controlling method as set forth in claim 1, in which the predetermined network is a local area network having a plurality of electronic devices connected in accordance with Digital Living Network Alliance (DLNA).

5. A receiving apparatus operable within a predetermined network which receives a digital television broadcast, comprising:
    a decoder which decodes a stream containing video data and/or audio data, obtains attribute information from the stream, and outputs a video signal and an audio signal;
    a video process section which performs a predetermined video process for the video signal;
    an audio process section which performs a predetermined audio process for the audio signal; and
    a control section which controls processes for the decoder, the video process section, and the audio process section,
    wherein the control section controls the video process section and the audio process section to perform a mute process for a decoded output of the stream,
    the decoder to perform a first decode process of decoding a partial region of the stream from a beginning thereof and obtaining attribute information from the stream,
    the video process section and the audio process section to set parameters with which the stream is reproduced on a basis of the attribute information,
    the decoder to stop the first decode process and the video process section and audio process section to stop the mute process immediately after they have set the parameters, and
    the decoder to perform a second decode process of decoding the stream from the beginning thereof,
    in which the mute process causes a black picture to be displayed on a display screen and/or sounds not to be generated, such that during the mute process pictures corresponding to the decoded output are not displayed on the display screen and/or sounds corresponding to the decoded output are not generated,
    in which the control section causes the second decode process to be performed after a first amount of time has elapsed after (i) the first decode process is stopped, (ii) the parameters are set, and (iii) the mute process is stopped, and the pictures corresponding to the decoded output are enabled to be displayed on the display screen and/or the sounds corresponding to the decoded output are enabled to be generated after a second amount of time has elapsed after (i) the first decode process is stopped, (ii) the parameters are set, and (iii) the mute process is stopped, in which the second amount of time is larger than the first amount of time, such that the decoding performed by the second decode process is not continuous with an end of the decoding performed by the first decode process.

6. The receiving apparatus as set forth in claim 5, further comprising:

a communicating section which communicates with an external device through the network and receives a stream from the external device which stores the stream under a control of the control section.

7. The receiving apparatus as set forth in claim 5, further comprising:
a connecting section which connects the receiving apparatus to an external device and receives a stream from the external device which stores the stream under a control of the control section.

* * * * *